May 7, 1957  K. F. MAUER  2,791,236
MULTIPLE VALVE MECHANISM
Filed April 16, 1956

INVENTOR
KARL F. MAUER.
BY
ATTORNEY

United States Patent Office 2,791,236
Patented May 7, 1957

2,791,236

MULTIPLE VALVE MECHANISM

Karl F. Mauer, Forest Hills, N. Y.

Application April 16, 1956, Serial No. 578,381

2 Claims. (Cl. 137—608)

This invention relates to a multiple valve mechanism.

The invention relates mainly but not exclusively to a valve for use in connection with fish tanks which are equipped with aerators and filters and a common pump associated therewith. The conventional practice is to provide a separate valve on each air line. Thus, in a relatively small tank in which only a single aerator and a single filter are installed, there would be two separate air lines, one to the aerator and the other to the filter, and each air line would embody a valve. While this arrangement performs well, it involves certain difficulties and disadvantages which the present invention is intended to eliminate.

Among the disadvantages inherent in the use of a plurality of air lines and a plurality of valves connected to the air lines is the fact that these air lines and their several valves become confusing to the user who frequently confuses the one for the other, intending to actuate the aerator valve and instead actuating the filter valve and vice versa. Furthermore, these air lines and their valves normally occupy awkward or inaccessible positions and it is necessary to hunt for them before they can be operated. In addition, they tend to clutter the floor in the area of the fish tank, thereby rendering the place unsightly and causing an accumulation of dust and other foreign matter.

A solution to the problem is disclosed in Patent No. 2,708,450 which was issued to me on May 17, 1955. The present invention consitutes an improvement over said patent and it involves a substantial advance in the direction of a complete solution to said problem.

The principal object of the present invention is the provision of a multiple valve mechanism, wherein a single housing incorporates a plurality of valves which control the needs of a conventional fish tank having at least one aerator and one filter connected to a common source of air under pressure. The valve mechanism herein claimed may embody a plurality of valve mechanisms, at least two but not limited to two. However, for the purposes of this application, the mechanism will be described solely in terms of a single valve body incorporating but two valve mechanisms.

An equally important object of this invention is the provision of a multiple valve mechanism of the character described, embodying two valve units, only one of which controls the flow of air both to the aerator and the filter, the other valve unit functioning solely as a relief or escape valve.

A disadvantage of conventional air pressure systems installed in fish tanks is that they generally lack the means of preventing the overloading of the motor which drives the air pump. In the present device, the relief or escape valve prevents such overloading. In use, the several valve members would be so adjusted that an ample supply of air reaches both the filter and the aerator. Over and above such supply of air is a surplus which passes through the relief or escape valve. It is this latter feature which prevents the development of excessive back pressure upon the air pump and consequently prevents over- loading and turning out of the motor which drives said pump.

The invention is illustrated in the accompanying drawing in which.

Figure 1:
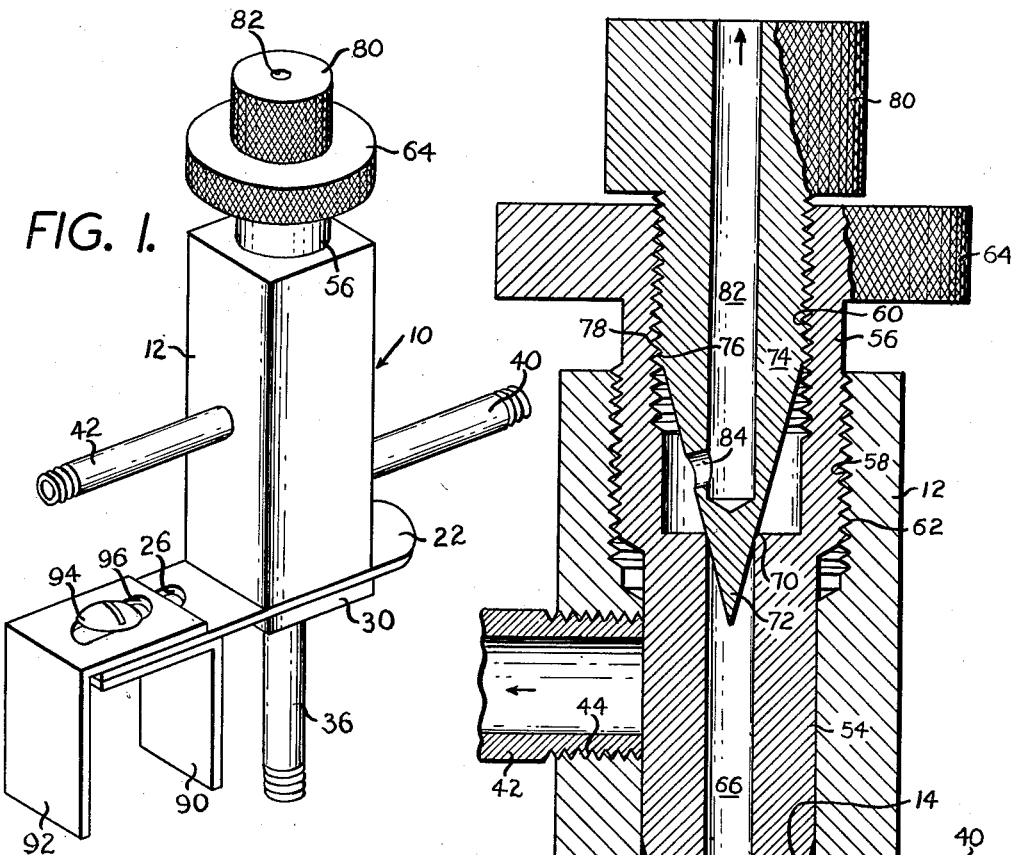
Fig. 1 is a perspective view of a multiple valve mechanism made in accordance with this invention, showing a single inlet port and a pair of outlet ports.

The multiple valve unit 10 shown in the drawing includes a valve housing 12 which is hollow and is provided with a valve chamber 14. The lower end of housing 12 is reduced to form a generally cylindrical tubular portion 16 which is provided with external screw threads 18 and internal screw threads 20. A supporting plate 22 is provided with two holes 24 and 26 respectively, hole 24 being adapted to receive said tubular portion 16 and the other hole being intended for a purpose which will shortly become apparent. Plate 22 bears against shoulder 28 of the valve housing and a nut 30 screwed to the outer threads 18 of said tubular portion 16 clamps said plate to said shoulder. An inner shoulder 32 is formed above the inner screw threads 20 to receive a washer 34. An inlet tube or pipe 36, provided with external screw threads at its upper end, may be screwed into said tubular portion 16 into abutment with washer 34, thereby providing an airtight connection with the valve housing.

A tapped hole 38 is provided in the side wall of valve housing 12 a short distance above the lower tubular portion 16 of said housing. An outwardly threaded outlet tube or pipe 40 is screwed into said tapped hole 38 and a relatively tight fit will provide a sufficiently air-tight connection, although an arrangement similar to the washer 34 and shoulder 32 construction above mentioned may be utilized here, if desired. This outlet tube or pipe 40 is intended to be connected to an air line leading to an aerator, commonly known as a stone. Inlet tube or pipe 36 is connected, of course, to an air line leading to a conventional motor driven air pump. A second outlet tube or pipe 42 is provided in the valve housing 12 a spaced distance above the outlet tube or pipe 40. More specifically, a second tapped hole 44 is provided in the valve housing substantially above, but not necessarily on the same side as, the first mentioned tapped hole 38. The tube 42 is externally threaded for engagement with said second tapped hole 44 and here, too, a tight fit will result in an air-tight connection but a washer and a shoulder against which the washer may abut may also be used, if desired. Reference is here made to an arrangement wherein a washer is interposed between the end of the tube and a shoulder formed in the valve housing, as shown at the lower tubular end of valve housing 12. Tube 42 is connected to an air line which is attached to the filter. It will be observed that all three tubes inlet tube 36 and outlet tubes 40 and 42 are in communication with the valve chamber 14.

A valve seat 50 is formed at the lower end of valve chamber 14, immediately above and concentric with shoulder 32 above mentioned. Valve seat 50 is a tapered conically-shaped seat adapted to cooperate with the conical point 52 of a valve needle 54. It will be seen that the needle 54 comprises a tubular member which is closed at its lower end or point 52 and which is enlarged in its upper portion 56. Upper portion 56 is provided with external screw threads 58 and internal screw threads 60. The upper end of valve housing 12 is provided with internal screw threads 62 which engage with external screw threads 58, thereby maintaining needle 54, and its upper enlarged portion 56 in particular, in screw-threaded engagement with the valve housing. A knurled knob portion 64 is formed at the upper end of the enlarged portion 56 of needle 54. It will now be observed, that knurled knob 64 may be turned manually in either direction to move the valve needle 54 longitudinally of the valve housing 12. When it is turned in one direction, said valve needle may be brought into engagement with the valve seat 50, thereby closing the passage between the valve chamber and the inlet tube 36. Said knurled knob may be turned in the opposite direction to move the valve needle away from said seat and thereby to open the valve.

It has been stated that needle 54 is tubular and that, of course is also true of its upper portion 56, including the knob 64. A second valve chamber 66 is thereby formed within said needle 54, the first chamber 14 being outside of said needle and within the valve housing 12. A passageway 68 is provided between these two valve chambers and it will be noted that said passageway is simply a laterally extending hole formed in the side wall of needle 54, a slight distance above its conical point 52.

A generally conical valve seat 70 is formed in needle 54 slightly below its upper and enlarged portion 56. This valve seat 70 is adapted to receive and cooperate with the conical point 72 of a second valve needle 74. This valve needle 74 is tubular in structure, being closed solely at its lower end or point 72. It is provided with external screw threads 76 which are engageable with internal screw threads 78 formed in the enlarged upper portion 56 of valve needle 54. The upper end of the second valve needle 74 is enlarged to form a knurled knob 80. Within said second valve needle 74 is a third chamber 82 which is open at the top and closed at the bottom by said pointed end portion 72. A laterally extending hole 84 is formed in the side wall of said valve needle 74 to provide communication between chamber 82 and the second mentioned valve chamber 66. By turning knurled knob 80 in one direction, said needle 74 is brought into engagement with the valve seat 70 to close off communication between said last mentioned chambers 82 and 66. By turning said knurled knob in the opposite direction, said needle 74 is disengaged from said valve seat 70 in order to provide communication between said last mentioned chambers.

The foregoing mechanism may be supported on the side wall of a fish tank or the like by means of the supporting plate 22 and the brackets secured thereto. It will be observed that an L-shaped bracket 90 and a second L-shaped bracket 92 are adjustably secured to each other and to the supporting plate 22 by means of a screw 94 which extends through opening 26 in said supporting plate 22. This opening is elongated to provide for lateral movement of said screw 94 in order to adjust the positions of said brackets laterally of the valve housing 12. There is also an elongated opening 96 in the upper bracket 92 in order to provide for lateral adjustment of said bracket relative to the lower bracket 90. In this manner the two brackets may be brought closer together or moved farther apart to adjust to the thickness of the side wall of the fish tank.

In use, the valve mechanism above described is mounted on a fish tank by means of the supporting plate and brackets last mentioned. Tube 40 is attached to an air line connected to the aerator or stone. Tube 42 is connected to an air line which is attached to the filter. Tube 36 is attached to an air line leading to the air pump. When needle 54 engages seat 50, there is no flow of air into the valve and none to the aerator and filter. When said needle 54 is disengaged from said valve seat, a flow of air into the valve chamber 14 takes place.

Figure 2:
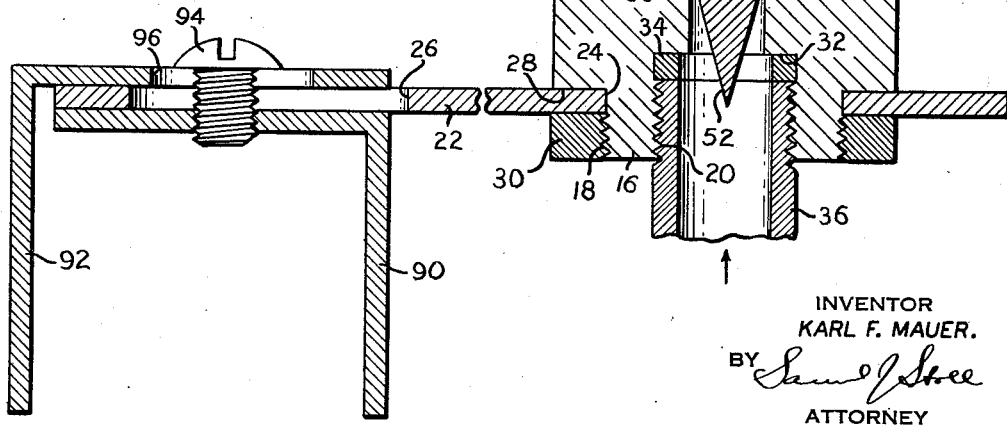
Fig. 2 is an enlarged longitudinal section through said valve mechanism.

It will now be observed that needle 54 is cylindrical in shape above its tapered or conical point 52. The diameter of its cylindrical portion corresponds to the diameter of valve chamber 14 save for such clearance as may be necessary to provide for relative movement of said needle within said valve chamber. Consequently, when the inlet port is opened to admit air into the valve chamber the port leading to outlet tube 40 is automatically opened to the flow of air from said inlet port. But the outlet port leading to tube 42 may remain closed as Fig. 2 clearly shows. To open the port to outlet tube 42, it is necessary to move needle 54 a sufficient distance to bring its conical point 52 opposite tube 42. Now boh tubes 40 and 42 are in communication with valve chamber 14 and both receive a flow of air from the inlet tube 36.

To avoid undue back pressure upon the pump, needle 74 may be manipulated to adjust the size of the opening between its pointed end 72 and valve seat 70. When the opening is too large, there will be insufficient pressure within the valve chamber 14 to actuate the aerator and filter. When the opening is too small, or when it is entirely closed, too much pressure may develop within said valve chamber 14, thereby imposing an unnecessary burden upon the air pump and the motor which operates it. Consequently, by adjusting the position of said needle 74 relative to the seat 70, an optimum relationship between said needle and said seat may be attained which permits of full and complete operation of the aerator and filter while avoiding unnecessary back pressure upon the pump.

The foregoing is illustrative of a preferred form of this invention and it will be understood that this form may be modified and other forms may be provided within the broad spirit of the invention and the broad scope of the claims.

I claim:

1. A multiple valve of the character described, comprising a tubular valve housing, an inlet port at its lower end, an outlet port formed in its side wall above said inlet port, a second outlet port formed in its side wall above the first outlet port, a valve chamber formed within said valve housing, all three ports being in communication therewith, a valve seat formed within said valve housing between the first outlet port and said inlet port, and a valve needle mounted within said valve housing, the upper end of said needle being in screw-threaded engagement with the upper end of said housing, whereby said needle may be turned in one direction relative to the housing to advance said needle into engagement with said valve seat in order to close off the inlet port from the valve chamber, and whereby said needle may be turned in the opposite direction relative to the housing to disengage the valve seat in order to provide communication between said inlet port and said valve chamber, said valve needle being hollow, a second valve chamber being formed therein, an opening being provided in the side wall of said valve needle to provide communication between the valve chamber in the valve housing and the valve chamber in said needle, a second valve seat being formed within said needle and a second valve needle being provided within the first valve needle for engagement with said second valve seat, said second valve needle being in screw-threaded engagement with the first valve needle, whereby turning the second valve needle in one direction relative to the first valve needle advances said second valve needle into engagement with the second valve seat and whereby turning said second valve needle in the opposite direction relative to the first valve needle disengages said second valve needle from said second valve seat, said second valve needle being also hollow and being open at its upper end to the atmosphere, an opening being formed in its side wall to provide communication between the second valve chamber and the atmosphere when said second valve needle is out of engagement with the second valve seat.

2. A multiple valve of the character described, comprising a tubular valve housing, an inlet port at its lower end, an outlet port formed in its side wall above said inlet port, a second outlet port formed in its side wall above the first outlet port, a valve chamber formed within said valve housing, all three ports being in communication therewith, a valve seat formed within said valve housing between the first outlet port and said inlet port, and a valve needle mounted within said valve housing, the upper end of said needle being in screw-threaded engagement with the upper end of said housing, whereby said needle may be turned in one direction relative to the housing to advance said needle into engagement with said valve seat in order to close off the inlet port from the valve chamber, and whereby said needle may be turned in the opposite direction relative to the housing to disengage the valve seat in order to provide communication between said inlet port and said valve chamber, said valve needle being hollow, a second valve chamber being formed therein, an opening being provided in the side wall of said valve needle to provide communication between the valve chamber in the valve housing and the valve chamber in said needle, a second valve seat being formed within said needle and a second valve needle being provided within the first valve needle for engagement with said second valve seat, said second valve needle being in screw-threaded engagement with the first valve needle, whereby turning the second valve needle in one direction relative to the first valve needle advances said second valve needle into engagement with the second valve seat and whereby turning said second valve needle in the opposite direction relative to the first valve needle disengages said second valve needle from said second valve seat, said second valve needle being also hollow and being open at its upper end to the atmosphere, an opening being formed in its side wall to provide communication between the second valve chamber and the atmosphere when said second valve needle is out of engagement with the second valve seat, the upper end of the first valve needle being provided with a knurled knob by which it may be turned relative to the valve housing, the upper end of the second valve needle being also provided with a knurled knob by which it may be turned relative to the first valve needle.

References Cited in the file of this patent

UNITED STATES PATENTS

| | | |
|---|---|---|
| 535,468 | Teal | Mar. 12, 1895 |
| 801,812 | Reniff | Oct. 10, 1905 |
| 1,017,688 | Rape | Feb. 20, 1912 |
| 2,323,480 | MacDougall | July 6, 1943 |

FOREIGN PATENTS

| | | |
|---|---|---|
| 479,101 | Germany | of 1929 |